United States Patent [19]

Loveless

[11] 4,012,567

[45] Mar. 15, 1977

[54] TITANATE ESTER CURE OF UNSATURATED ELASTOMERS

[75] Inventor: Frederick C. Loveless, Cheshire, Conn.

[73] Assignee: Uniroyal Inc., New York, N.Y.

[22] Filed: Mar. 12, 1975

[21] Appl. No.: 557,712

[52] U.S. Cl. .......................... 526/48; 260/768 R; 526/17; 526/20; 526/21

[51] Int. Cl.² ...................... C08F 8/43; C08F 8/14

[58] Field of Search .............. 450/619; 260/94.7 A, 260/85.1, 83.3, 80.78, 82.1, 92.3, 768; 526/48, 17, 56, 20, 21

[56] References Cited

FOREIGN PATENTS OR APPLICATIONS

| | | | |
|---|---|---|---|
| 2,059,168 | 5/1971 | France | 260/94.7 |
| 1,074,180 | 1/1960 | Germany | 260/94.7 |
| 848,455 | 9/1960 | United Kingdom | 260/94.7 |
| 852,936 | 11/1960 | United Kingdom | 260/94.7 |
| 1,198,880 | 7/1970 | United Kingdom | 260/94.7 |

*Primary Examiner*—William F. Hamrock
*Attorney, Agent, or Firm*—James J. Long

[57] ABSTRACT

Unsaturated elastomers (e.g., cis-polyisoprene) and blends containing unsaturated elastomers can be cured (gelled) by admixing with 1 to 10 phr organo titanate ester [$(RO)_4Ti$, e.g., tetra-n-butyl titanate]. Gellation takes place only when the mixture is exposed to the open atmosphere and can be prevented by maintaining the mixture in a closed system.

14 Claims, No Drawings

TITANATE ESTER CURE OF UNSATURATED ELASTOMERS

This invention relates to a method of curing unsaturated elastomers and to the cured product obtained by such method.

The invention is based on the discovery that unsaturated elastomers and blends containing unsaturated elastomers can be cured (crosslinked or gelled to an insoluble state) by admixing with 1 to 10 parts by weight, per 100 parts by weight of elastomers, of an organo titanate ester. Cure or gellation takes place only when the mixture is exposed to the open atmosphere and can be prevented by maintaining the mixture in a closed system. The cure is also prevented if a substantial amount of water or water-yielding substance is present, or a substantial amount of a non-volatile organic hydroxy compound (alcohol, phenol) is present.

The unsaturated elastomers that may be cured in accordance with the invention include cis-polyisoprene (whether natural or synthetic), polybutadiene, notably cis-polybutadiene, butadiene-styrene copolymer rubber, butadiene-acrylonitrile copolymer rubber, EPDM rubber (notably ethylene-propylene-5-ethylidene-2-norbornene terpolymer rubber having an iodine number greater than 8), polychloroprene rubber, butyl rubber (isoprene-isobutylene copolymer), and blends of such elastomers.

The organo titanate esters employed as curatives or crosslinking agents to gel the unsaturated elastomer in accordance with the invention are tetrahydrocarbyl titanates of the formula $(RO)_4Ti$ where R is a hydrocarbyl group, such as an alkyl group, e.g., an alkyl group having 1 to 12 carbon atoms, preferably 3 to 8 carbon atoms, or an aryl group having 6 to 10 carbon atoms, such as cresyl.

British Pat. No. 848,455, Crocker, published Sept. 14, 1960 discloses a pressure sensitive adhesive composition containing a titanate ester to improve the holding power and/or buckling resistance. The composition exemplified includes substantial quantities of aluminum hydrate and non-volatile phenolic substances. German Auslegeschrift No. 1,074,180, Schneider, Jan. 18, 1960 discloses an adhesive which contains a titanium compound and retains its elasticity after drying. The formulation shown contains substantial amounts of non-volatile phenolic substance. The present curable composition in contrast, is devoid of hydrated substances which would yield water, and non-volatile phenolic substances, in amounts great enough to prevent the cure of the composition by the action of the titanate ester.

In preparing the curable composition of the invention the mixing of the organo titanate ester cross-linking agent and unsaturated elastomer may be carried out under non-evaporative conditions in a closed system such as an internal mixer, e.g., a sigma blade mixer (such as a Baker-Perkins [trademark] or a closed Brebender mixer [trademark]). Alternatively, the organo titanate ester may be mixed with the unsaturated elastomer in solution in an inert volatile organic solvent for the elastomer (e.g., n-hexane), preferably in the presence of a small amount of a volatile alcohol (e.g., ethyl alcohol) to suppress premature gellation. Gellation then occurs only after evaporation of the solvent and alcohol. In the most typical practice of the invention the mixing is carried out under conditions which suppress gelation (i.e., in a closed system under non-evaporative conditions, or in the presence of a volatile alcohol) and then, after the mixture has been shaped into a desired useful form (e.g., molded, extruded, coated, etc.), the mixture is permitted to gel simply by exposing to evaporative conditions in the open atmosphere.

In general, from 1 to 10 phr of the titanate ester is added to the elastomer to be cured. Depending on the rubber and the amount of extraneous hydroxylic compounds such as anti-oxidants (hydroxylic compounds are inhibiting substances in the cure) it contains, the amount and type of titanate ester used dictate the rate and extent of cure obtained.

The temperature and time required for cure again depend on the presence or absence of hydroxylic (inhibiting) additives and the type and level of titanate employed. Cure of the mixture is accompanied by evaporation of alcohol, corresponding to the alkoxy portion of the titanate ester. Hence, titanate esters of lower boiling alcohols effect cure more rapidly than titanate esters of higher boiling alcohols, e.g., isopropyl titanate acts more rapidly than butyl titanate which in turn acts more rapidly than ethylhexyl titanate. Elevated temperatures speed up the cure rate regardless of the type and level of titanate, although in the absence of added hydroxylic inhibitor and solvent cure is rapid at room temperature. In general, from 1 to 10 days are required for cure at room temperature depending on such factors as the nature of the rubber, the amount of hydroxylic impurity, the surface to volume ratio (the greater the surface exposed, the more rapid the cure), as well as the level and type of titanate ester. It is a remarkable feature of the cure that the curable mixture can be processed at elevated temperatures (under non-evaporative conditions) without premature cure, and yet cure can be accomplished at ambient temperature (under evaporative conditions).

As indicated, it has been observed that the curing reaction is accompanied by the evolution of alcohol, that is, an alcohol ROH corresponding to the organic group of the ester $(RO)_4Ti$ is generated during the cure. If the alcohol is prevented from evaporating, as in a closed container where non-evaporative conditions prevail, the cure will not go forward. However, when the curable composition is placed in the open atmosphere where evaporative conditions prevail, and the evolved alcohol ROH can escape, the cure proceeds. Thin sections such as coatings deposited from a solution, calendered or extruded films and sheets, and similar thin sections (e.g., 0.2 inch thick or less) have higher surface to volume ratio than thicker sections (such as most molded objects) and present greater opportunity for the generated alcohol ROH to escape. Therefore such thin sections cure more rapidly than thick sections.

As the cure proceeds the gel content of the rubber (that is, the fraction insoluble in organic liquids that are normally solvents for the uncured elastomer) increases, indicating that crosslinking is taking place, and evolution of alcohol continues until a plateau of gel content is reached.

As indicated, hydroxylic additives have an inhibiting effect on the cure. For instance phenolic antioxidants have been found to slow down the cure rate. When such antioxidants are removed as nearly as possible solutions of the rubbers tend to gel quickly when titanate esters are added. Normally, appreciable gellation occurs slowly upon evaporation of solvent from the solution. Addition of small amounts of volatile alcohol to solutions of rubber (such as cis-polyisoprene) inhibits any tendency toward premature gellation. In fact, the rate of cure can be controlled by the molecular weight of the added alcohol. Low molecular weight alcohols such as ethyl alcohol have a mild or temporary inhibiting effect while higher boiling alcohols such as dodecyl alcohol have a more severe and lasting inhibiting effect. For purposes of the invention the curable composition should contain less than one mole of non-volatile organic hydroxyl containing material (phenol, alcohol), per mole of titanate ester. The composition should also be substantially devoid of water (or water-yielding substances such as hydrates), since water prevents the cure.

After gellation, the gelled rubber is insoluble in toluene and other organic solvents, but addition of acid such as acetic acid reverses the process and the rubber becomes soluble again. Addition of carboxylic acids likewise inhibits gel formation.

While it is not desired to limit the invention to any particular theory of operation, it appears to be possible that the crosslinking is a consequence of titanate ester formation with the elastomer, which is surprising since the elastomers employed are non-hydroxylated elastomers, that is, they are not elastomers which have been deliberately chemically modified so as to contain large quantities of hydroxyl groups. In any event, unsaturation appears to be necessary to the cure.

The curable composition is useful as a caulking compound, wherein advantage can be taken of the fact that in a closed container (non-evaporative conditions) the composition remains plastic and uncrosslinked, whereas when applied to a joint or object to be caulked in the open atmosphere (evaporative conditions) the composition then cures to a crosslinked, gelled state. The composition is useful as a sound absorbent material, as an undercoating for automobiles, etc. Useful shaped articles of all sorts may be made from the composition, by conventional shaping processes (e.g., molding, extrusion, calendering) followed by curing of the shaped article.

A remarkable feature of the invention resides in the fact that the gelling or crosslinking can be reversed by substances which promote hydrolysis, notably acids, particularly carboxylic acids such as the alkanoic acids (e.g., acetic acid). Advantage can be taken of this fact to recover or reclaim cured material, such as cured scrap, for reuse. Thus, to convert the gelled crosslinked material to a soluble, non-crosslinked state in which it is once again processable and thermoplastic, all that is necessary is to treat the cured material with a reagent such as acetic acid. This is conveniently accomplished by immersing the cured material in a solvent for the uncured elastomer, containing for example 5% or less to 30% or more of acid based on the weight of the cured product. After a period of time (e.g., upon standing overnight) the elastomer is observed to become soluble and processable once again. The hydrolyzed product may be recovered from the solution by any suitable conventional means for recovering elastomers from cements (e.g., by steam flocculation) and thereafter may be reused in the same manner as uncured rubber. It will be apparent that substantial economies are made possible by this procedure.

EPDM suitable EPSM elastomer for use in the invention is that in which the non-conjugated diene is 5-ethylidene-2-norbornene. The iodine number of the EPDM elastomer is suitably at least 8, preferably at least 12, e.g., 17 or more, up to for example 25 or higher.

The following examples will serve to illustrate the practice of the invention in more detail.

EXAMPLE 1

This example illustrates the formation of gel in three different rubbers at different levels of butyl titanate and at different cure times.

The following solutions were prepared:

A. 200 g SMR-CV5 (natural rubber, Standard Malaysian Rubber, Constant Viscosity 5), in 1900 g hexane.

B. 200 g Cariflex (trademark, Shell synthetic high cis content [greater than 90%] polyisoprene) in 1900 g hexane.

C. 200 g JSR-BRO1 (Japan Synthetic Rubber, cis polybutadiene) in 1900 g hexane.

Two hundred gram portions of the cements A, B and C were then treated with varying amounts of tetra (n-butyl) titanate as recorded below. The solutions of rubber and titanate were poured into aluminum pans and the solvent was allowed to evaporate. This required approximately 2 days time. Gel contents were measured on the samples after 3, 6 and 10 days. The following table summarizes the results (PHR stands for parts per hundred parts of rubber, by weight).

| Solution | Butyl titanate | % gel (Room Temperature Toluene) | | |
|---|---|---|---|---|
| (200 g) | added (PHR) | 3 days | 6 days | 10 days |
| A | 0 | 1.1 | — | — |
| A | 0.16 (0.85) | 2.2 | 16.2 | 42.9 |
| A | 0.32 (1.7) | 18.4 | 86.1 | 86.8 |
| A | 0.8 (4.25) | 82.3 | 89.3 | 87.1 |
| A | 1.6 (8.5) | 87.0 | 90.6 | 91.9 |
| B | 0 | 2.9 | — | — |
| B | 0.16 (0.85) | 81.2 | 84.2 | 83.7 |
| B | 0.32 (1.7) | 80.2 | 84.2 | 84.9 |
| B | 0.80 (4.25) | 87.2 | 86.9 | 86.5 |
| B | 1.60 (8.50) | 68.3 | 66.1 | 86.9 |
| C | 0 | 2.9 | — | — |
| C | 0.16 (0.85) | 1.4 | 1.9 | 30.7 |
| C | 0.32 (1.7) | 11.1 | 37.8 | 55.9 |
| C | 0.80 (4.25) | 14.7 | 58.0 | 66.1 |
| C | 1.60 (8.5) | 4.8 | 59.3 | 61.9 |

This example illustrates the extremely facile cure of both natural and synthetic cis polyisoprene. The somewhat better cure of the synthetic material at low titanate levels may be a result of the natural impurities in the NR.

EXAMPLE 2

This example illustrates the use of tetraisopropyl and tetra(2-ethylhexyl)titanates for the gellation of natural and synthetic cis polyisoprene.

The solutions A and B are those prepared for Example 1.

| Solution (200 g) | Titanate (0.8 g) | % gel after 2 days standing (Room temp. toluene) |
|---|---|---|
| A | isopropyl | 89.7 |
| A | ethylhexyl | 81 |
| B | isopropyl | 79.5 |
| B | ethylhexyl | 83.5 |

Clearly butyl (from Example 1), isopropyl, and ethyl hexyl titanates all produce high levels of gel in synthetic or natural cis polyisoprene.

EXAMPLE 3

This example illustrates the gellation of an EPDM (ethylene-propylene-5-ethylidene-2-norbornene terpolymer rubber; ethylene-propylene ratio 57:43, by weight; iodine number 17, Mooney viscosity 52 ML-4°–257° F.). In this example, 0.85 PHR titanate and 8.5 PHR titanate respectively are added to hexane solutions of the EPDM and allowed to dry at ambient conditions. Two hundred grams of 9.5% solids cement (19 g rubber) were used.

| Solution | Butyl titanate, g. | % gel after 2 days (Room temp. toluene) |
| --- | --- | --- |
| A 200 g (19 g EPDM) | 0.16 | 48.2 |
| B 200 g (19 g EPDM) | 1.6 | 54.0 |
| C 200 g (19 g EPDM) | 0 | 9.2 |

This EPDM develops gel even at very low titanate levels.

EXAMPLE 4

This example illustrates an undercoating composition of the invention.

The following solution may be mixed:

| | Parts by Weight |
| --- | --- |
| Toluene | 1000 |
| Natural rubber (SMR-CV5) | 100 |
| Carbon black | 50 |
| Tetra(n-butyl)titanate | 5 |

The solution may be sprayed on the underbody of an automobile to provide protection and sound absorption.

EXAMPLE 5

This example illustrates reversal of the cure by the action of acid, for the purpose of making the rubber reusable. This has particular applicability to the re-utilization of cured scrap by reversing the cure and recycling the material.

A 5 g sample of each of the materials A, B and C of Example 1 cured with 8.5 parts of tetra(n-butyl) titanate PHR for 10 days is immersed in 100 ml of toluene containing 2 g of acetic acid. After standing overnight at room temperature the samples were completely soluble. The rubber may be recovered from the toluene solution by conventional steam flocculation and dried for reuse.

I claim:

1. A method of curing an unsaturated elastomer consisting essentially of mixing 100 parts by weight of the said elastomer with from 1 to 10 parts by weight of an organo titanate ester, the resulting mixture being substantially anhydrous and containing less than one mole of non-volatile organic hydroxy compound per mole of titanate ester, and exposing the resulting mixture to the atmosphere, whereby the unsaturated elastomer becomes cured by the action of the said organo titanate ester.

2. A method as in claim 1 in which the said unsaturated elastomer is selected from the group consisting of natural rubber, synthetic cis-polyisoprene elastomer, polybutadiene elastomer, butadiene-styrene copolymer rubber, butadiene-acrylonitrile copolymer rubber, ethylene-propylene-5-ethylidene-2-norbornene terpolymer rubber having an iodine number greater than 8, polychloroprene rubber, and isobutylene-isoprene copolymer rubber.

3. A method as in claim 1 in which the said elastomer is selected from the group consisting of natural rubber, synthetic cis-polyisoprene elastomer, cis-polybutadiene elastomer and ethylene-propylene-5-ethylidene-2-norbornene terpolymer rubber having an iodine number of at least 12.

4. A method as in claim 1 in which the said organo titanate ester is selected from the group consisting of tetraalkyl titanate and tetraaryl titanate.

5. A method as in claim 1 in which the said organo titanate ester is a tetraalkyl titanate in which the alkyl group contains from 1 to 12 carbon atoms.

6. A method as in claim 1 in which the said organo titanate ester is a tetraalkyl titanate in which the alkyl group contains from 3 to 8 carbon atoms.

7. A method as in claim 1 in which the organo titanate ester and elastomer are mixed under closed, non-evaporative conditions, and the mixture is thereafter exposed to evaporative conditions to effect the cure.

8. A method as in claim 1 in which the organo titanate ester and elastomer are mixed in an inert volatile organic solvent for the elastomer containing an alcohol whereby the cure is inhibited and the solvent and alcohol are thereafter removed to effect the cure.

9. A method as in claim 1 in which the organo titanate ester and elastomer are mixed in the presence of an hydrolylic inhibiting substance, and the inhibiting substance is thereafter removed to effect the cure.

10. A method as in claim 1 in which the said organo titanate ester is the sole curative present.

11. A method as in claim 1 in which the mixture of organo titanate ester and elastomer is formed into the shape of a desired article prior to cure.

12. A method as in claim 11 in which the said shape is a thin film or sheet.

13. The cured product resulting from the method of claim 1.

14. A method as in claim 1 in which the cured product is thereafter converted back into a soluble, uncured state by immersing the cured product in a volatile organic solvent for the uncured elastomer containing a carboxylic acid, whereby the elastomer dissolves in the solvent, and thereafter recovering the thus-reclaimed elastomer from the solvent.

* * * * *